United States Patent [19]

Rannenberg

[11] Patent Number: 4,535,606
[45] Date of Patent: Aug. 20, 1985

[54] HIGH EFFICIENCY AIR CYCLE AIR CONDITIONING SYSTEM

[75] Inventor: George C. Rannenberg, Canton, Conn.

[73] Assignee: United Technologies Corporation, Hartford, Conn.

[21] Appl. No.: 560,007

[22] Filed: Dec. 9, 1983

[51] Int. Cl.³ .............................................. F25D 9/00
[52] U.S. Cl. ......................................... 62/402; 62/434
[58] Field of Search ........................... 60/39.07, 39.33; 62/402, 86, 434

[56] References Cited

U.S. PATENT DOCUMENTS

| | | | |
|---|---|---|---|
| 2,772,621 | 12/1956 | Arnoldi | 60/39.07 |
| 2,966,047 | 12/1960 | De Paravicini | 62/335 |
| 3,277,658 | 10/1966 | Leonard, Jr. | 62/87 |
| 3,355,903 | 12/1967 | LaFleur | 62/88 |
| 3,367,125 | 2/1968 | McGrath | 62/116 |
| 3,494,145 | 2/1970 | Davis et al. | 62/402 |
| 3,868,827 | 3/1975 | Linhardt et al. | 62/63 |
| 4,127,011 | 11/1978 | Giles et al. | 62/402 |

Primary Examiner—Ronald C. Capossela
Attorney, Agent, or Firm—John Swiatocha

[57] ABSTRACT

A high efficiency air cycle air conditioning system (10), driven and charged by a gas turbine engine (15), operates in a closed-loop, Brayton cycle. The system includes a main (bootstrap) compressor (75) discharging to a sink heat exchanger (85) which in turn discharges to a regenerative heat exchanger (110). Air is ducted from the regenerative heat exchanger to an expansion turbine (120) where the air is chilled and then ducted to load (20). Air exhausted from the load is again ducted through the regenerative heat exchanger where the load exhaust air precools turbine inlet air. The capacity (operating pressures) of, and input power to the system are controlled by modulation of charge air provided to the system from the gas turbine engine and if desired, may be further controlled by selective bleeding of air from the system, selective bypassing of the system turbine with refrigerant, or modulation of shaft input power to the main compressor.

22 Claims, 5 Drawing Figures

HIGH EFFICIENCY AIR CYCLE AIR CONDITIONING SYSTEM

DESCRIPTION

1. Technical Field

This invention relates generally to air cycle air conditioning systems and more particularly to a gas turbine engine powered air cycle air conditioning system of enhanced efficiency.

2. Background Art

Air cycle air conditioning systems are well known and commonly used for cooling and pressurizing compartments such as passenger cabins in commercial and military aircraft. One reason for the popularity of such systems is the substantial amount of cooling available from air cycle systems of relatively modest size. Another reason for the popularity of such systems has been the adaptability thereof to gas turbine engine powered vehicles, the compressor discharge section of the gas turbine engine providing a convenient source of pressurized refrigerant air for the air conditioning system.

Typically, state of the art air cycle air conditioning systems utilize a compressor which receives pressurized air from a source thereof, further compresses the air and discharges the air to a heat exchanger where the air gives up a portion of the heat of compression. From this heat exchanger, the compressed air is ducted to an expansion turbine wherein work done by the air in moving the turbine rotor causes a rapid expansion and cooling of the air, the cooled air then being discharged to a load such as an aircraft cabin. The turbine is connected to the compressor in a bootstrap arrangement whereby rotation of the turbine rotor by the expanding air provides input power to the compressor.

For the most part, such air cycle air conditioning systems have been open-loop systems. That is, subsequent to cooling the load, the refrigerant air is exhausted overboard, only a minute portion thereof in some cases being recirculated to the turbine exhaust for melting ice therein in the manner set forth in U.S. Pat. No. 4,374,469 to Rannenberg.

While open-loop air cycle air conditioning systems such as those described hereinabove provide effective cooling and pressuring, where such systems are both charged and driven by gas turbine engines, the rapidly increasing cost and decreasing availability of gas turbine engine fuel dictate that increases in system efficiency be constantly pursued. Such increases in efficiency are not only required to minimize the power expended by the engine (and therefore the fuel consumption thereof) in operating the air conditioning system, but also to minimize the physical size of the system. Pursuit of enhanced system compactness is, like pursuit of enhanced efficiency, important in reducing fuel costs associated with the system operation as well as enabling use of the system in the confined environment associated with many gas turbine engine powered vehicles such as cruise missiles, military aircraft, tanks and other land and air vehicles.

DISCLOSURE OF INVENTION

It is therefore a principal object of the present invention to provide a high efficiency air cycle air conditioning system powered by a gas turbine engine.

It is another object of the present invention to provide such an air cycle air conditioning system characterized by enhanced compactness.

These and other objects which will become more evident from the following detailed description taken in connection with the appended claims and accompanying drawings, are achieved by the air cycle air conditioning system of the present invention wherein substantially the entire cooled airflow supplied to the load is, subsequent to the cooling thereof, exhausted therefrom back to the inlet of the system's bootstrap compressor whereby the bootstrap compressor, the tubine connected thereto, and the load define a closed-loop, high pressure, circulatory system which is charged by refrigerant air supplied by a gas turbine engine and injected into the closed refrigerant loop between the load and the inlet to the bootstrap compressor. Such a closed-loop arrangement allows the charge of refrigerant air in the system to be cyclically reused, whereby the gas turbine engine which powers the system is not required to continually supply fresh refrigerant air to the load as in prior art gas turbine engine powered air cycle air conditioning systems. This, of course, increases the efficiency of the system by reducing the load the system places on the gas turbine engine power source. Furthermore, recirculating all the refrigerant air from the load to the bootstrap compressor rather than exhausting to ambient, in essence, "seals" the system loop, thereby enabling the system to operate at higher refrigerant pressures than prior art open-loop systems. Operating at such higher pressures further enhances the efficiency of the system by reducing the parasitic losses associated with the system's fluid handling apparatus. The higher system operating pressures are also responsible for higher refrigerant densities whereby cooling is effected with smaller volumes of air and therefore more compact apparatus. The connection between the load and the bootstrap compressor inlet also makes regenerative heat exchange between air exhausted from the load and turbine inlet air convenient, thereby further enhancing the efficiency of the system by taking more complete advantage of the cooling capabilities of the system.

The system of the present invention also includes a means such as a thermostat for sensing the cooling requirements of the load and providing an output signal indicative of those requirements to a control means such as a valve which regulates the flow of air through the system in response thereto, whereby the output of the system (and hence, input power thereto), is limited by load cooling demand. This inlet control valve may be disposed in a line through which refrigerant charge air is input to the system from the compressor discharge section of the gas turbine engine, or in a line which bypasses the system's turbine thereby regulating the amount of air ducted therethrough. Further regulation of system cooling output may be provided by a control valve in an exhaust line leading overboard from the discharge side of the compressor to further reduce the charge of air circulating in the closed-loop system, such control valve being set in the same manner as the inlet control valve noted hereinabove, that is, in response to load cooling demand.

For increased (and therefore, enhanced) system operating pressures, supply air may be provided to the system's bootstrap compressor from the gas turbine engine by means of an auxiliary compressor which steps up the air pressure from that of the engine's compressor discharge section. The auxiliary compressor is driven either by the gas turbine engine rotor or a power turbine driven by air bled from the engine's compressor discharge section. The main system (bootstrap) compressor may, as the auxiliary compressor, be driven directly by the rotor of the gas turbine engine, indirectly by means of a hydraulic or electric transmission driven by the gas turbine engine rotor, or by means of a power turbine driven by engine compressor discharge air. The output of the power turbine is controlled by regulating the compressor discharge air provided to the power turbine with either a control valve or alternatively, by means of a variable geometry power turbine inlet which is set in response to the cooling demands of the load.

BEST MODE FOR CARRYING OUT THE INVENTION AND INDUSTRIAL APPLICABILITY THEREOF

Figure 1:
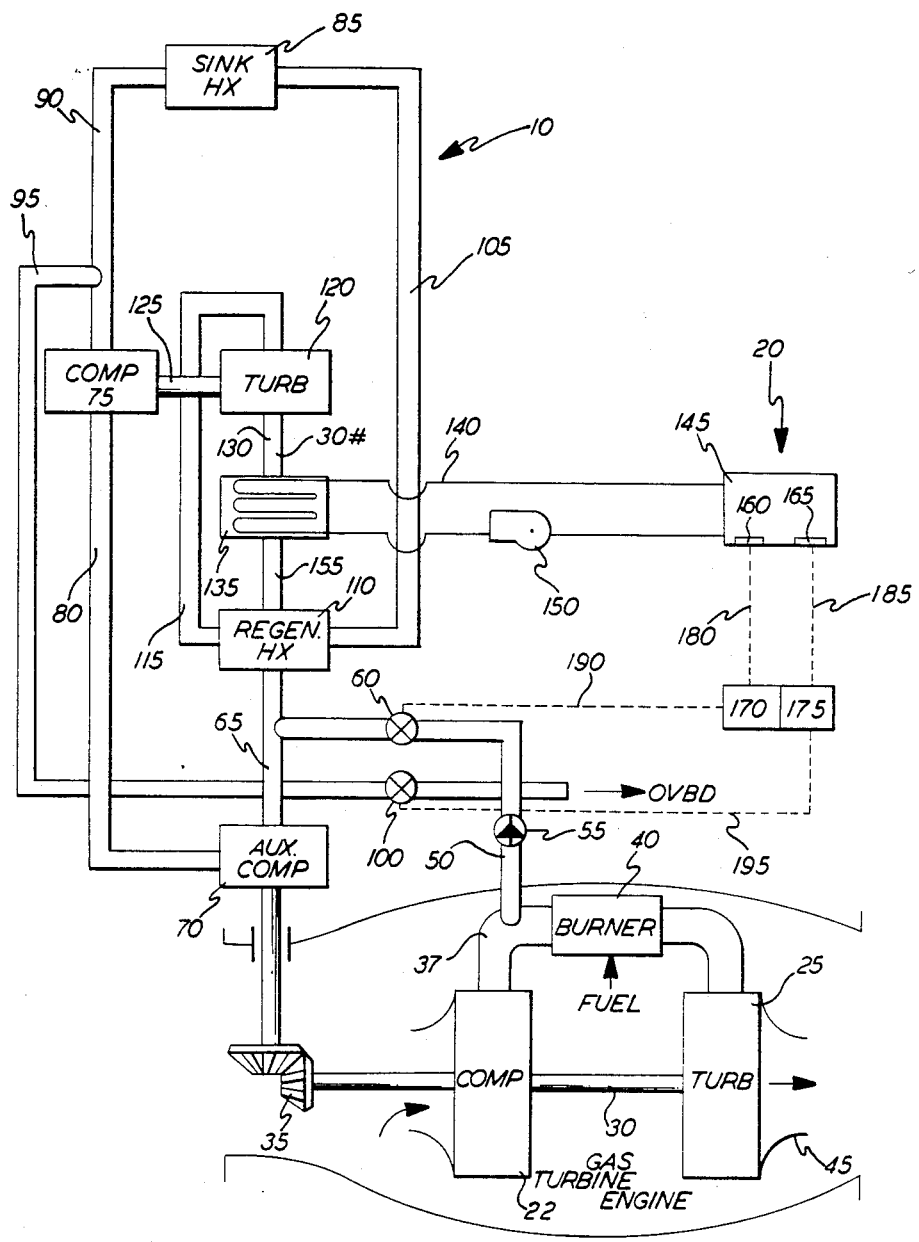
FIG. 1 is a schematic representation of a preferred embodiment of the air cycle air conditioning system of the present invention.

Referring to FIG. 1, the air cycle, air conditioning system of the present invention indicated generally at 10 is both charged and driven by a gas turbine engine 15, and provides cooling and if required, pressurization of a system load 20. In typical fashion, gas turbine engine 15 comprises a compressor 22 driven by a turbine 25 the rotors of the turbine and compressor being connected by shaft 30 having bevel gear 35 mounted thereon. As is well known in the gas turbine engine art, air is drawn into the compressor, compressed to an elevated pressure, discharged from the compressor at discharge section 37 and mixed with fuel in burner 40 where the air-fuel mixture is burned. The products of combustion exhausted from burner 40 are ducted to turbine 25 thereby driving the turbine to both power the compressor and provide useful thrust through exhaust nozzle 45.

Air from the compressor discharge section 37 of gas turbine engine 15 charges refrigeration system 10 through line 50 having a check valve 55 and a control valve 60 therein. This system supply air is typically of a pressure in the range of 30 to 100 p.s.i. From duct 50, the charge air is fed through duct 65 to auxiliary compressor 70 which precompresses refrigerant air in a closed refrigerant loop (to be described in further detail hereinafter), discharging the precompressed air to main (bootstrap) compressor 75 through line 80. Bootstrap compressor 75 further compresses the refrigerant air for delivery to sink heat exchanger 85 through conduit 90. The combined pressure ratio of auxiliary compressor 70 and bootstrap compressor 75 is typically on the order of 3 to 1 at the maximum cooling capacity operating point of the system. Conduit 95 communicates with conduit 90 downstream of compressor 75 and includes a control valve 100 therein through which compressed supply air is selectively exhausted overboard in response to reduced cooling requirements of the load which call for reduced closed-loop refrigerant air pressure in a manner to be discussed in more detail hereinafter. The compressed refrigerant air is cooled within sink heat exchanger 85 by maintenance therewithin of the compressed air in heat exchange relationship with a suitable heat sink such as cooler ambient air. From the sink heat exchanger, the compressed air is ducted through conduit 105 to a regenerative heat exchanger 110 and then through conduit 115 to expansion (cooling) turbine 120 the rotor of which connects to the rotor of bootstrap compressor 75 by shaft 125. In the traversal of turbine 120, the compressed air rotates the turbine rotor (and therefore, the rotor of compressor 75) thereby performing work thereon and causing an expansion of the air in the turbine whereby the air is typically chilled to provide a temperature drop of about 100° F. as the pressure thereof is lowered by a pressure ratio of 3 to 1. The chilled and expanded air is exhausted from the turbine through conduit 130 to a load heat exchanger 135 which forms a portion of system load 20. In the load heat exchanger, air discharged from cooling turbine 120 cools a liquid heat exchange fluid such as, for example, ethylene glycol circulating through closed-loop 140 between the load heat exchanger 135 and compartment 145 to be cooled such as an electrical equipment compartment of an aircraft, or land vehicle or any other volume to be cooled by means of the chilled fluid in loop 140. It will be noted that as used herein load 20 comprises load heat exchanger 135 and compartment 145. Pump 150 circulates the fluid around loop 140 between load heat exchanger 135 and compartment 145. To take full advantage of the remaining cooling capacity of the air, the air exhausted from the load heat exchanger is ducted through regenerative heat exchanger 110 where it is maintained in heat exchange relationship with air ducted to the inlet of turbine 120 through conduits 105 and 115 for precooling the turbine inlet air. Regenerative heat exchanger 110 exhausts into conduit 65 through which the air is returned to auxiliary compressor 70 for recirculation through air conditioning system 10.

Control valves 60 and 100 are operated in response to sensors (thermostats) 160 and 165 disposed within compartment 145. These thermostats provide signals indicative of the actual and desired temperature within compartment 145 to controllers/actuators 170 and 175 through lines 180 and 185, respectively. Controllers/actuators 170 and 175 are mechanically connected to valves 60 and 100 through any suitable connecting means such as linkages or the like indicated by lines 190 and 195.

From the description hereinabove, the operation of system 10 is evident. Auxiliary compressor 70 precompresses the air supplied from the compressor discharge section 37 of gas turbine engine 15 prior to delivery to bootstrap compressor 75. Bootstrap compressor 75 further compresses the air, exhausting the air to sink heat exchanger 85 wherein the compressed air rejects heat to ambient or any other suitable heat sink provided. The compressed air is further cooled in regenerative heat exchanger 110 by the rejection of heat to the air discharged from load heat exchanger 135 prior to the admission of the compressed air into expansion turbine 120 wherein the air is expanded and chilled for delivery to load heat exchanger 135. The liquid coolant circulating within loop 140 is chilled within heat exchanger 135 and delivered to compartment 145 for the cooling thereof. Air discharged from the load heat exchanger is exhausted to the regenerative heat exchanger for precooling turbine inlet air as described hereinabove and then exhausted to auxiliary compressor 70 where it is again precompressed for the next cycle.

The capacity of air conditioning system 10 is controlled and the input power to the system is limited by valves 60 and 100 which determine refrigerant air pressure in the loop. At steady state conditions, i.e., when the cooling provided by system 10 is equal to that required by volume 145, assuming no leakage of air from the system, both valves 60 and 100 are maintained in a closed condition by controllers/actuators 170 and 175 and the various pressures and flow rates within the system remain constant as does the cooling output thereof. In the event that less cooling is required by volume 145, controller/actuator 175 will open control valve 100 to exhaust refrigerant overboard, thereby reducing refrigerant pressure within the system 10 and thus reducing the shaft power absorbed by the auxiliary compressor 70 and the kinetic energy absorbed by the bootstrap compressor 75, from the gas turbine engine compressor discharge air. This, of course, reduces the power expended by engine 15 in driving the system. Should the refrigeration demands of volume 145 decrease substantially, actuator/controller 175, in response to an output signal of sensor 165 fully opens control valve 100 while actuator/controller 170 in response to an output signal from sensor 160 fully closes control valve 60 for maximum reduction in refrigerant pressure and input power to the system. As the cooling demands of volume 145 increase, actuator/controller 175 closes control valve 100 in response to the output signal of thermostat 165 while actuator/controller 170 opens control valve 60 in response to the output signal from thermostat 160 thereby increasing the refrigerant pressure within system 10 to increase the capacity and therefore the output thereof.

It is seen that the gas turbine engine operated air cycle environmental control system of the present invention provides effective load cooling with enhanced efficiency. Since the system is a closed-loop system, under steady state conditions, the gas turbine engine must provide only that energy necessary to achieve the required refrigeration from a constant quantity of refrigerant air and therefore is not required to continually supply refrigerant air as is the case in open systems wherein the refrigerant air is exhausted overboard after cooling the load. Furthermore, the closed-loop nature of the system (at steady state conditions) allows the system to operate at substantially higher refrigerant pressures than those at which open-loop systems operate. With the inlet air control valve fully open, the lowest pressure in the system is as high as full engine compressor discharge pressure and the highest pressure in the closed loop (the cooling turbine inlet pressure), will typically be higher by a pressure ratio of 3 to 1. Such higher pressures in the air loop are manifested in higher air densities and thus enable refrigeration with lower volumetric flow rates of refrigerant air and thus more compact equipment than open-loop systems operating at lower pressures. Furthermore, operation at higher pressures reduces the flow pressure drop losses per weight flow of air thereby further enhancing the efficiency of the system. Regenerative heat exchange between the air exhausted from the load heat exchanger and the turbine inlet air further enhances the efficiency of the system, especially where the temperature difference between the air entering and leaving load heat exchanger 135 is substantially less than the difference in temperature between compartment 145 and the (ambient) heat sink to which heat from the system compressor discharge air is rejected in heat exchanger 85. Under such conditions, the refrigerant air loses only a fraction of its cooling capacity as it passes through load heat exchanger 135, passage through regenerative heat exchanger 110 allowing the remainder of the cooling capacity of the load air to be utilized in precooling inlet air to turbine 120.

Figure 2:
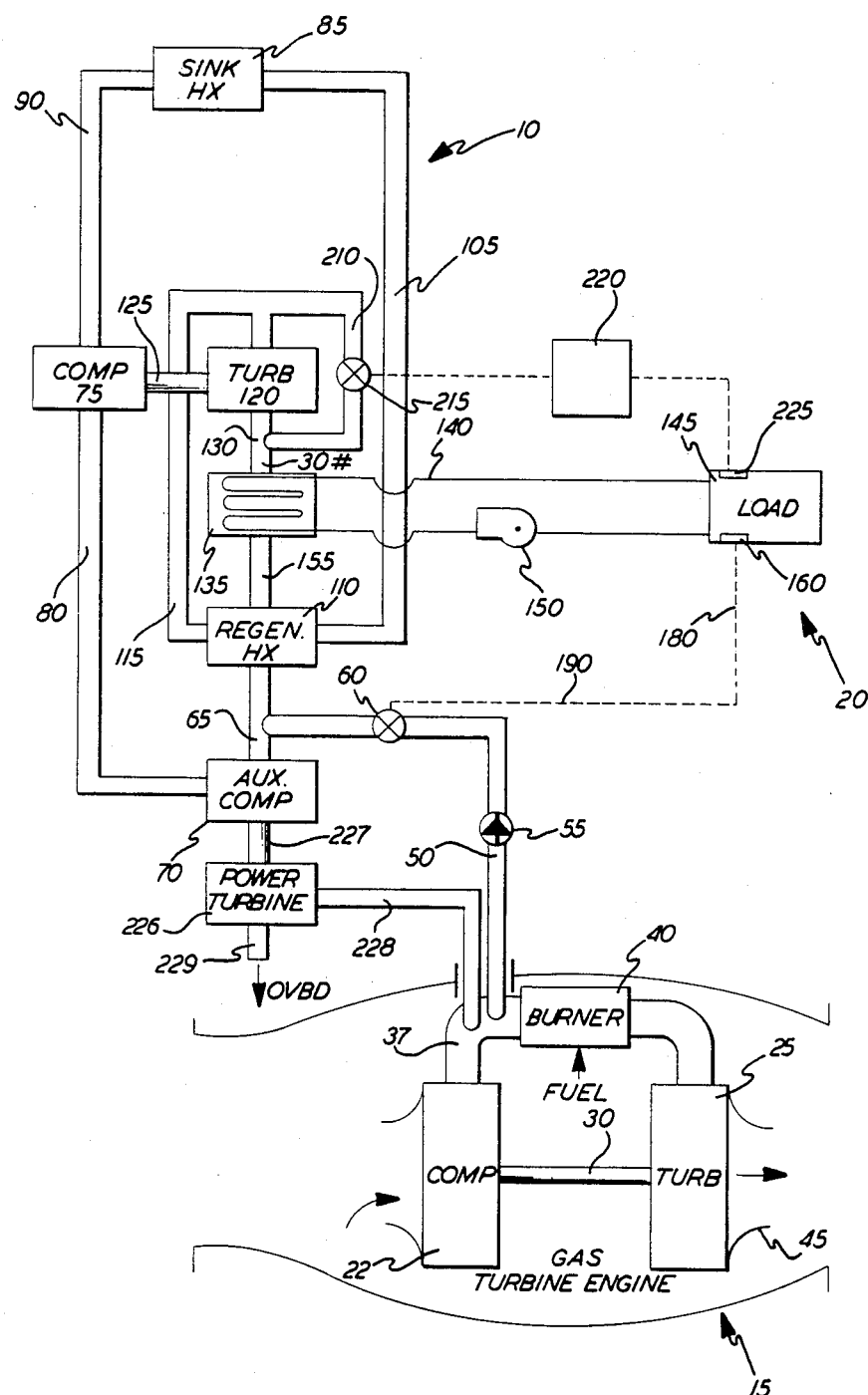
FIG. 2 is a schematic representation of a first alternate embodiment of the air cycle air conditioning system.

In the remaining drawings, alternate embodiments of the gas turbine powered air cycle air conditioning system are shown, corresponding reference numerals indicating corresponding components. Thus, it is seen that the system in FIG. 2 operates in precisely the same manner as the system shown in FIG. 1, with the exception of the control of system capacity. In FIG. 1, capacity control and therefore input power control and refrigeration output control are effected by controlling the admission of gas turbine engine compressor air to the system and the exhaust overboard of system compressor discharge air. In the embodiment of FIG. 2, the capacity and therefore input power to, and output power from the system are controlled by modulating the amount of compressed air which bypasses the system expansion turbine 120. Referring to FIG. 2, a portion of system compressor discharge air bypasses the turbine through duct 210 which connects ducts 115 and 130 and has a control valve 215 disposed therein. Valve 215 is operated by controller/actuator 220 responsive to the output signal of thermostat 225 mounted in the load compartment. Thus, it is seen that opening control valve 215 by actuator/controller 220 in response to a signal indicative of reduced refrigeration requirements will decrease the flow of air through the expansion turbine and therefore the amount of cooling available at load heat exchanger 135 and regenerative heat exchanger 110. Likewise, closing valve 215 will increase the amount of refrigerant air flowing through expansion turbine 120 and therefore the amount of refrigeration available at the load and regenerative heat exchangers. As in the first embodiment, in this second embodiment, modulation of refrigerant pressure and therefore system input power is attained by means of valve 60 which controls the admission of gas turbine engine compressor discharge air in response to output from thermostat 160. Also, in FIG. 2, the shaft connection between engine 15 and auxiliary compressor 70 is replaced by a power turbine 226 connected to the auxiliary compressor by shaft 227 and driven by air from engine compressor discharge section 37. Such air is supplied through conduit 228 and exhausted overboard from the power turbine through discharge nozzle 229.

Figure 3:
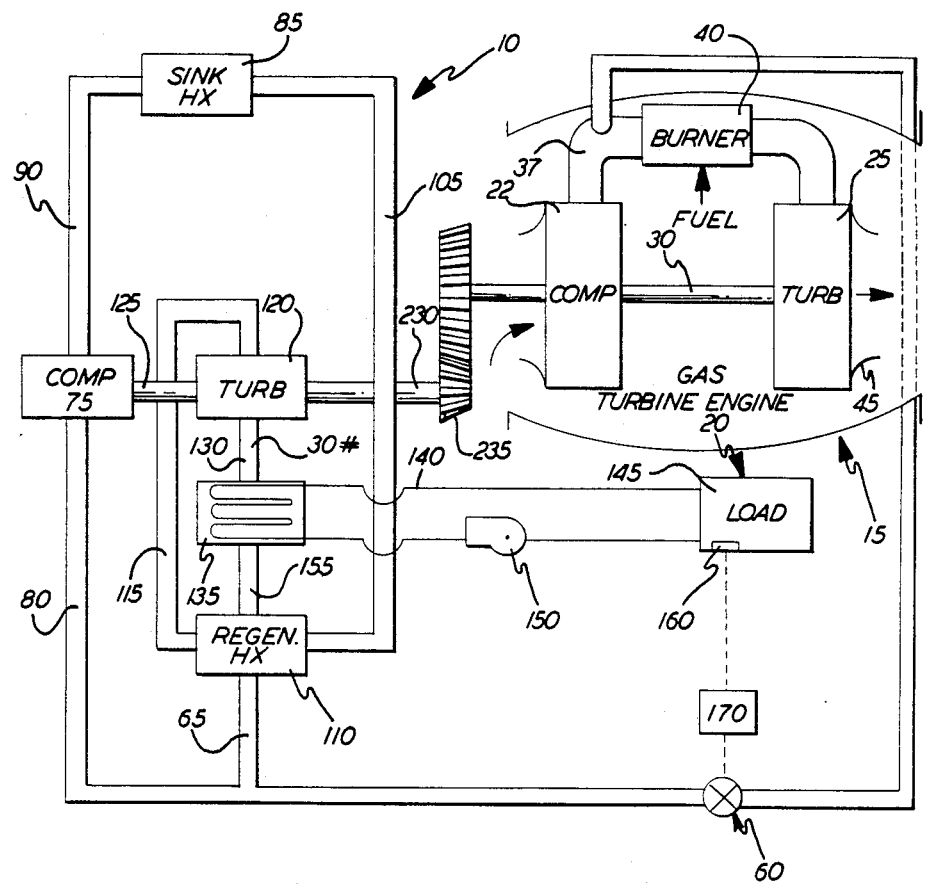
FIG. 3 is a schematic representation of a second alternate embodiment of the system of the present invention.

In the embodiment illustrated in FIG. 3, the exhaust of air discharged from the bootstrap compressor for the control of system capacity has been eliminated. In this embodiment, it is presumed that normal leakage of refrigerant air from the system will occur and therefore control of system capacity may be effected by the modulation of input air by valve 60 alone. Accordingly, it will be seen that a reduction in capacity is achieved by closing valve 60 whereby normal leakage from the system is not made up by compressor discharge air from the gas turbine engine. An increase in capacity is achieved by opening valve 60, thereby increasing the pressure within the system. It is further noted that in this embodiment, the auxiliary compressor has been eliminated and the bootstrap compressor is powered in part by the expansion turbine as in FIG. 1 and in part by connection (through the turbine rotor) with the gas turbine engine spool by means of shaft 230 and gear 235.

Figure 4:
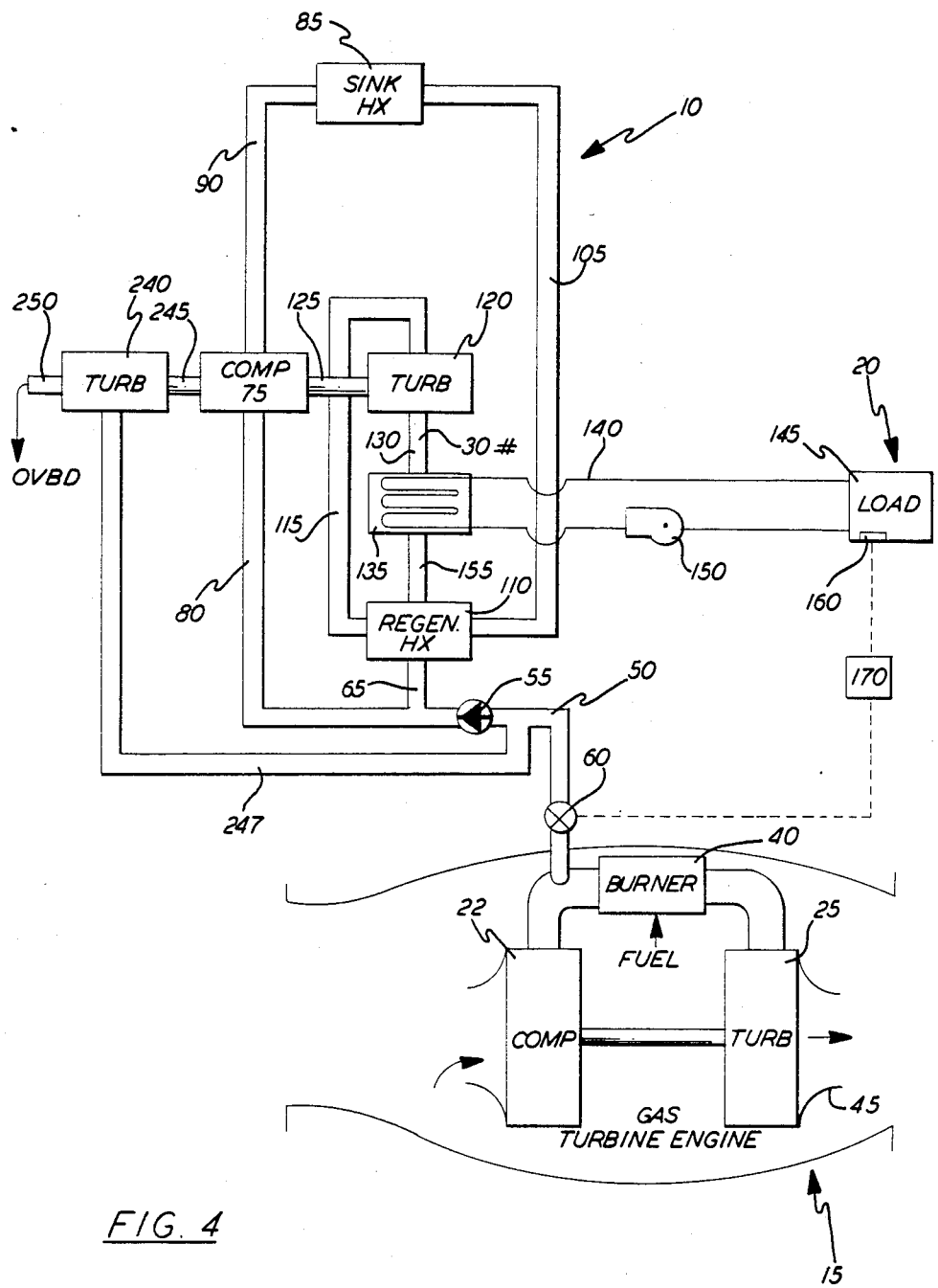
FIG. 4 is a schematic representation of a third alternate embodiment of the air conditioning system of the present invention.

In the embodiment of FIG. 4, bootstrap compressor 75 is driven by a power turbine 240 connected thereto by means of shaft 245. Power turbine 240 is driven by air supplied thereto by the compressor discharge section 37 of the gas turbine engine through conduit 247. Valve 60 simultaneously controls the volume of refrigerant air charging system 10 and powering the turbine 240 thereby simultaneously controlling the capacity of the system and the input power thereto. The air driving turbine 240 is exhausted overboard therefrom through discharge nozzle 250.

Figure 5:
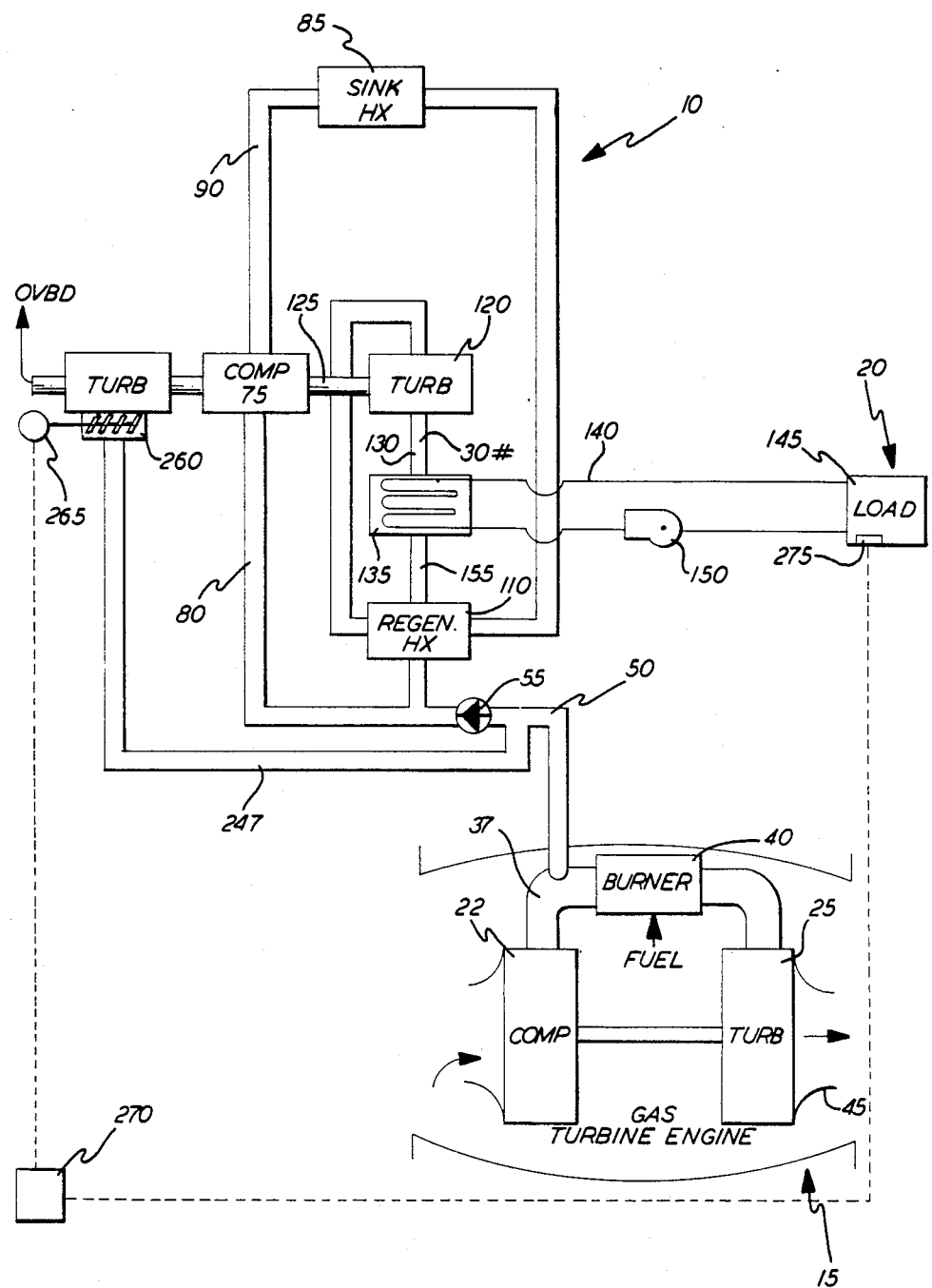
FIG. 5 is a schematic representation of a fourth alternate embodiment of the air conditioning system of the present invention.

The embodiment of FIG. 5, like the embodiment of FIG. 4, employs a power turbine to drive bootstrap compressor 75. However, in FIG. 5, the system capacity and the input power thereto are controlled by adjustable turbine inlet nozzle vanes 260 operated by actuator 265 which sets the effective inlet area in response to controller 270 which is responsive to an output signal from thermostat 275 in the load compartment. No modulation of inlet air to compressor 75 by a control valve is required. Accordingly, in FIG. 5, it is seen that an increase in demand for refrigeration results in the opening of turbine inlet 260 thereby increasing the input power to the turbine and thus, to compressor 75. Such an increase in turbine input power has a twofold effect, namely, an increase in the effective pressure ratio across bootstrap compressor 75 to increase the pressure of air discharged therefrom and also, an increase in the flow of air from compressor section 37 of gas turbine engine 15. Likewise, a reduction in refrigeration demand from the load adjusts the turbine inlet vanes to reduce input power to the turbine and hence compressor 75, lowering the pressure ratio across compressor 75 and decreasing the flow of air therethrough.

While the embodiments of the present invention described herein may differ in the mechanisms for controlling the input power to, and the capacity of system 10, all the embodiments exhibit the common characteristics of a closed-loop, high pressure air cycle refrigeration system charged and driven by a gas turbine engine and including a control means that responds to cooling demands to match system capacity with cooling requirements for optimum system compactness and efficiency. While various embodiments have been shown, it will be appreciated that various modifications may, from the disclosure herein, suggest themselves to those skilled in the art, and it is intended by the following claims to cover such modifications as fall within the true spirit and scope of this invention.

Having thus described the invention, what is claimed is:

1. In an air cycle refrigeration system for providing chilled refrigerant air to a load for the cooling thereof, said system being adapted for the supply thereto of compressed charge air from the compressor discharge section of a gas turbine engine and comprising a bootstrap compressor for increasing the pressure of said refrigerant air, airflow exhausted from said refrigerant compressor being directed to an expansion turbine for cooling thereby and discharge therefrom to said load, said expansion turbine and bootstrap compressor being mechanically interconnected whereby said expansion turbine provides, a measure of input power for driving said bootstrap compressor, said air cycle refrigeration system being characterized by:
   means for exhausting substantially the entire airflow from said load to an inlet of said bootstrap compressor whereby said bootstrap compressor, said expansion turbine and said load define a closed-loop circulatory system;
   a first conduit connecting said compressor discharge section of said gas turbine engine with said closed-loop circulatory system between said expansion turbine discharge and said bootstrap compressor inlet for providing said charge air to said refrigeration system whereby the system air pressure may be maintained at least at substantially the same level as the gas turbine engine compressor discharge pressure;
   means for sensing the cooling requirements of said load and providing an output signal indicative thereof; and
   a first control means disposed in said refrigeration system and responsive to the output signal from said sensing means for controlling the flow of air through said refrigeration system, thereby controlling the capacity thereof in response to the cooling requirements of said load.

2. The air cycle refrigeration system of claim 1 characterized by said first control means comprising a control valve disposed in said first conduit for controlling the flow of supply air to said refrigeration system.

3. The air cycle refrigeration system of claim 1 characterized by:
   a second conduit which bypasses said expansion turbine with at least a portion of refrigerant compressor discharge air; and
   said first control means comprising a control valve disposed in said second conduit for controlling the flow of said bypass air around said turbine.

4. The air cycle refrigeration system of claim 1 characterized by:
   a third conduit communicating at an inlet thereof with said closed-loop system at the discharge of said bootstrap compressor and exhausting overboard; and
   said first control means comprising a control valve disposed said third conduit for controlling the flow of bootstrap compressor discharge air exhausted overboard from said refrigeration system.

5. The air cycle refrigeration system of claim 1 characterized by said closed-loop circulatory system including a sink heat exchanger therein between the discharge of said bootstrap compressor and the inlet of said expansion turbine, said sink heat exchanger maintaining air discharged from said bootstrap compressor in heat exchange relationship with a heat sink for precooling said bootstrap compressor discharge air prior to admission thereof into said expansion turbine.

6. The air cycle refrigeration system of claim 5 characterized by said heat sink comprising a fluid normally at a temperature lower than that of said bootstrap compressor discharge air.

7. The air cycle refrigeration system of claim 1 characterized by said closed-loop circulatory system including a regenerative heat exchanger therein communicating with the discharge of said bootstrap compressor and the inlet and exhaust of said expansion turbine, said regenerative heat exchanger maintaining air discharged from said bootstrap compressor in heat exchange relationship with air exhausted from said expansion turbine for precooling said refrigerant compressor discharge air prior to admission thereof into said expansion turbine.

8. The air cycle refrigeration system of claim 1 characterized by said load comprising:
  means to be cooled;
  a load heat exchanger in fluid communication with the exhaust from said expansion turbine; and
  a closed loop of fluid circulating between said means to be cooled and said heat exchanger thereby removing heat from said means to be cooled and transferring said heat within said heat exchanger to said expansion turbine exhaust.

9. The air cycle refrigeration system of claim 1 characterized by an auxiliary compressor driven by said gas turbine engine and supplied with air from the compressor discharge section thereof by way of said first conduit, the discharge of said auxiliary compressor being ducted to the inlet of said bootstrap compressor for precompressing the air supplied thereto by said gas turbine engine.

10. The air cycle refrigeration system of claim 9 characterized by the rotor of said gas turbine engine being mechanically interconnected to the rotor of said auxiliary compressor for the driving thereof.

11. The air cycle refrigeration system of claim 9 characterized by a power turbine in fluid communication with said gas turbine engine compressor discharge section and driven by air provided thereby, a rotor portion of said power turbine being mechanically interconnected to the rotor in said auxiliary compressor for the driving thereof.

12. The air cycle refrigeration system of claim 1 characterized by the rotor of said gas turbine engine being mechanically interconnected to the rotor of said bootstrap compressor for the driving thereof.

13. The air cycle refrigeration system of claim 1 characterized by a power turbine in fluid communication with said gas turbine engine compressor discharge section and driven by air provided thereby, a rotor portion of said power turbine being mechanically interconnected to the rotor of said bootstrap compressor for the driving thereof.

14. The air cycle refrigeration system of claim 13 characterized by said power turbine communicating with said gas turbine engine compressor discharge section by means of said first conduit.

15. The air cycle refrigeration system of claim 14 characterized by said first control means comprising a control valve disposed in said first conduit for controlling both the flow of supply air to said refrigeration system and the flow of air for driving said power turbine.

16. The air cycle refrigeration system of claim 14 characterized by said first control means comprising a variable inlet of said power turbine.

17. A method of cooling a load with an air cycle refrigeration system, said method comprising the steps of providing charge air from the compressor discharge section of a gas turbine engine to the inlet of a main compressor of said refrigeration system, cooling said compressed supply air by heat transfer therefrom to a heat sink, chilling and expanding said compressed air in an expansion turbine and cooling said load by passing said chilled and expanded air therethrough, said method being characterized by the steps of:
  supplying said charge air to said refrigeration system without substantially lowering the pressure thereof; and
  exhausting said chilled and expanded air from said load and ducting substantially all of said load exhaust air to said inlet of said main compressor,
  whereby said refrigeration system operated in a closed-loop Brayton cycle at pressures at least substantially as high as the compressor discharge pressure of said gas turbine engine.

18. The method of claim 17 characterized by the steps of:
  sensing the cooling requirements of said load and providing an output signal indicative thereof; and
  controlling the magnitude of the charge airflow from said gas turbine engine compressor discharge section to said main compressor inlet in response to said output signal, thereby controlling the capacity of said refrigeration system in response to the cooling requirements of said load.

19. The method of claim 17 characterized by the steps of:
  sensing the cooling requirements of said load and providing an output signal indicative thereof;
  bypassing said refrigeration system turbine with a portion of said compressed air; and
  controlling the magnitude of the flow of said compressed air bypassing said turbine in response to said output signal, thereby controlling the capacity of said refrigeration system in response to the cooling requirements of said load.

20. The method of claim 17 characterized by the step of passing said compressed air in regenerative heat exchange relationship with said chilled and expanded air discharged from said expansion turbine, thereby precooling said compressed air before admission thereof to said expansion turbine.

21. The method of claim 17 characterized by the steps of:
  driving said main compressor with a power turbine powered by said gas turbine engine compressor discharge air;
  sensing the cooling requirements of said load and providing an output signal indicative thereof; and
  controlling the magnitude of the airflow from said gas turbine engine compressor discharge section to said power turbine in response to said output signal, thereby controlling the operation of said main compressor and therefore the capacity of said refrigeration system in response to the cooling requirements of said load.

22. The method of claim 17 characterized by the step of precompressing said gas turbine engine compressor discharge air with an auxiliary compressor powered by said gas turbine engine prior to passing said compressor discharge air to said main compressor.

* * * * *